United States Patent [19]
Yeo

[11] Patent Number: 6,009,003
[45] Date of Patent: Dec. 28, 1999

[54] CURRENT/VOLTAGE CONTROL APPARATUS FOR ELEVATOR SYSTEM

[75] Inventor: Hwan Je Yeo, Changwon, Rep. of Korea

[73] Assignee: LG Industrial Systems Co., Ltd., Seoul, Rep. of Korea

[21] Appl. No.: 09/003,327

[22] Filed: Jan. 6, 1998

[30] Foreign Application Priority Data

Jan. 14, 1997 [KR] Rep. of Korea ............................ 97-736

[51] Int. Cl.[6] ............................ H02M 5/45; H02H 7/125; H02P 5/40
[52] U.S. Cl. ................................ 363/37; 363/55; 318/729
[58] Field of Search ................................ 363/34, 37, 41, 363/55, 98, 132; 318/800, 805, 811, 729

[56] References Cited

U.S. PATENT DOCUMENTS

| | | | |
|---|---|---|---|
| 4,935,684 | 6/1990 | Watanabe | 318/729 |
| 4,958,117 | 9/1990 | Kerkman et al. | 363/41 |
| 5,483,167 | 1/1996 | Mikami | 363/37 |
| 5,550,450 | 8/1996 | Palko et al. | 318/800 |

*Primary Examiner*—Peter S. Wong
*Assistant Examiner*—Rajnikant B. Patel

[57] ABSTRACT

A current/voltage control apparatus for an elevator system which is capable of preventing an over current from being applied to an inverter by stopping a driving operation of the inverter when a difference (hereinafter called "current deviation") between a current instruction and actual current value exceed a predetermined value during a predetermined time. The apparatus includes a voltage limiter for setting a limit voltage value which is proportional to an operational frequency of the induction motor and applying the voltage below the limit voltage value to the inverter driving unit, a zero phase component current detector for detecting a zero phase component current and outputting an inverter driving stop signal to the inverter driving unit when the thusly detected current exceeds a predetermined reference value, and a current deviation detector for detecting a current deviation value and outputting an inverter driving stop signal to the inverter driving unit when the current deviation value, which exceeds a predetermined reference value, is continuously maintained for a predetermined time.

15 Claims, 5 Drawing Sheets

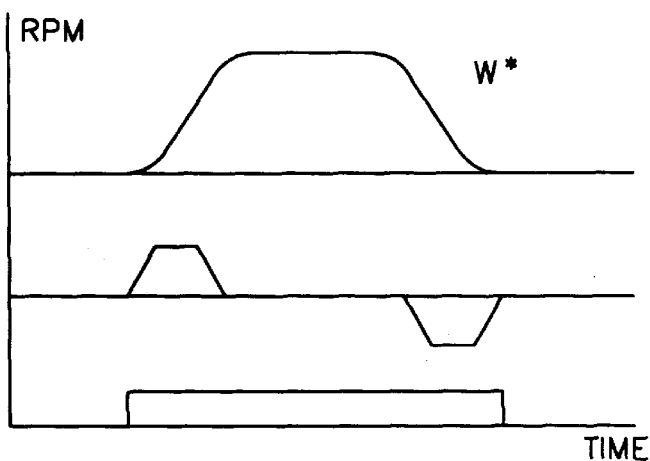
FIG. 2A CONVENTIONAL ART
FIG. 2B CONVENTIONAL ART
FIG. 2C CONVENTIONAL ART
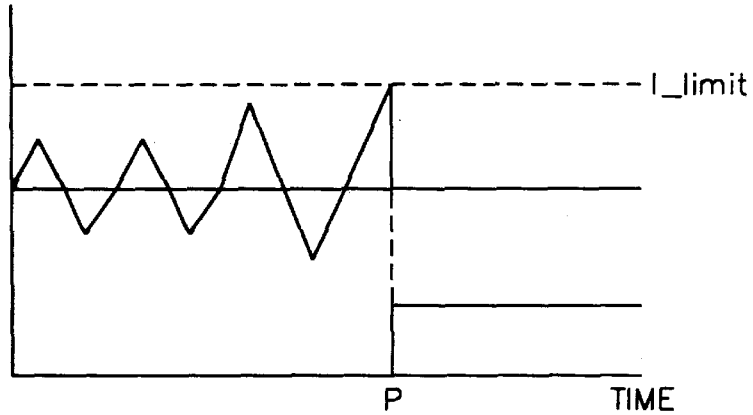
FIG. 3A CONVENTIONAL ART
FIG. 3B CONVENTIONAL ART
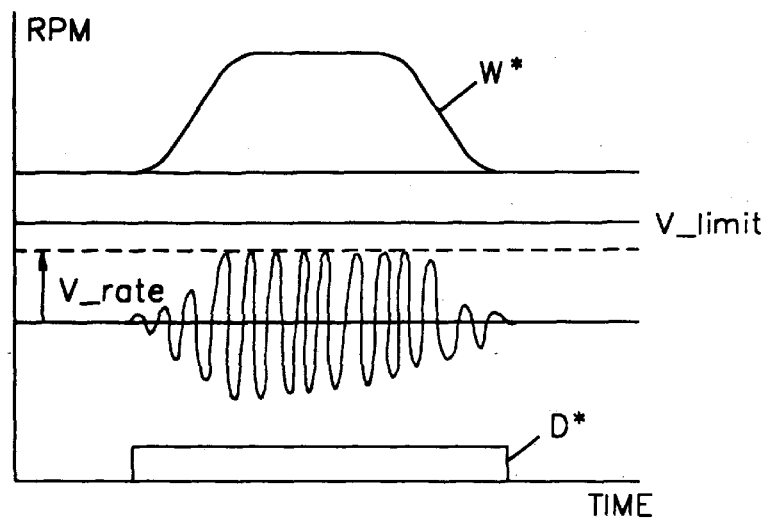
FIG. 4A CONVENTIONAL ART
FIG. 4B CONVENTIONAL ART
FIG. 4C CONVENTIONAL ART FIG. 6
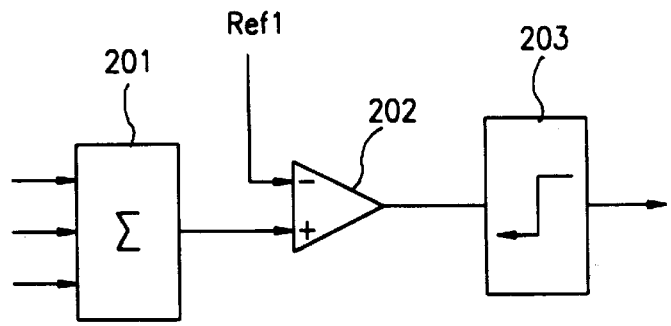
FIG. 7A
FIG. 7B
FIG. 7C
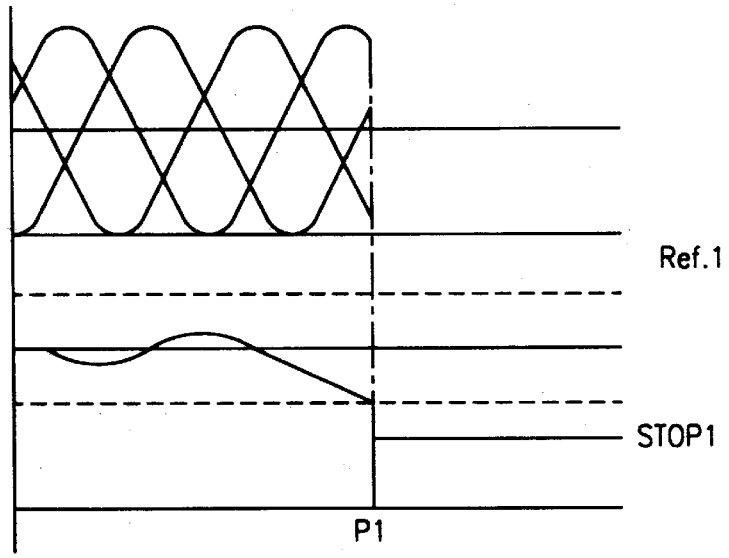
FIG. 8A
FIG. 8B
FIG. 8C
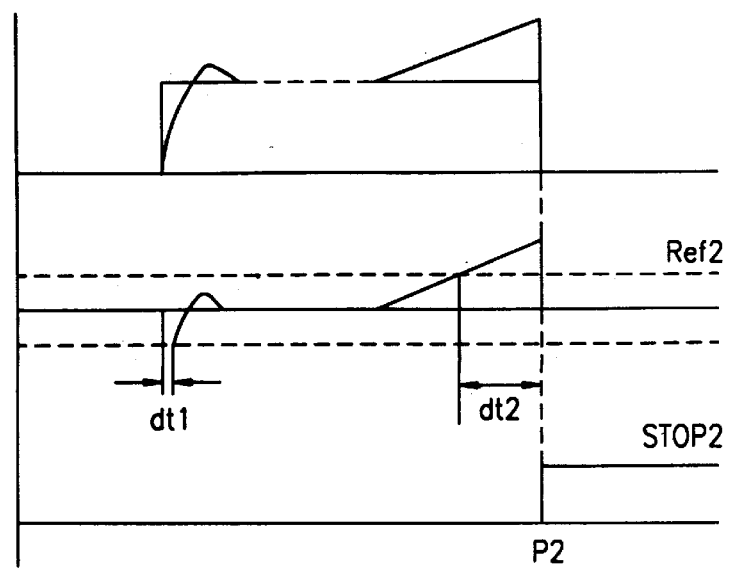

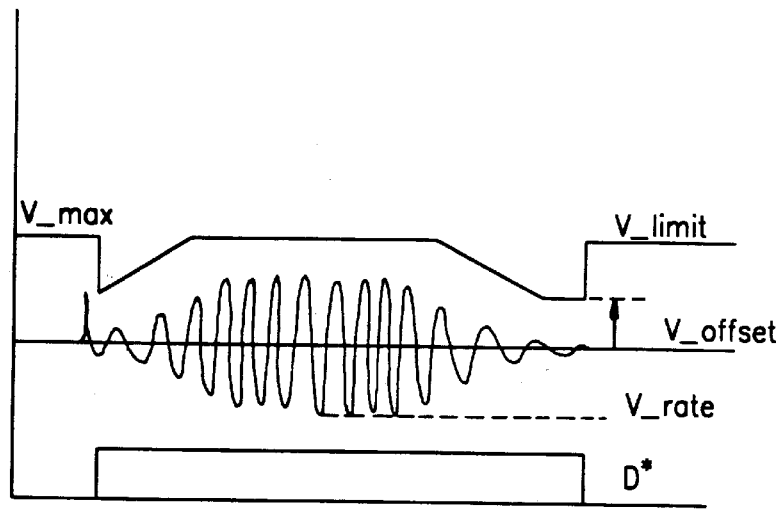

6,009,003

CURRENT/VOLTAGE CONTROL APPARATUS FOR ELEVATOR SYSTEM

BACKGROUND OF THE INVENTION

1. Field of the Invention

The present invention relates to a current/voltage control apparatus for an elevator system, and in particular to an improved current/voltage control apparatus for an elevator system which is capable of preventing an over-current and over-voltage from being transferred to an inverter.

2. Description of the Background Art

As the technology of a high-power semiconductor device is advanced, the motor type for the elevator system is changed from the direct current motor to the induction motor. For controlling the induction motor, recently a vector control method is increasingly used based on a VVVF (Variable Voltage Variable Frequency). In particular, the input current of the induction motor is separated into a magnetic component current and a torque component current for vector-controlling the induction motor, so that an instantaneous torque control of the induction motor is made possible.

In order to VVVF-control the induction motor, there are provided a converter for converting a three-phase alternating current voltage into a direct current voltage and an inverter for converting the direct current voltage into an alternating current voltage of a variable voltage type and variable frequency type. The instantaneous torque control of the induction motor is implemented by controlling the switching operation of the inverter. Therefore, the current/voltage control apparatus is designed to prevent an abnormal operation of the inverter.

FIG. 1 illustrates the inner construction of the conventional current/voltage control apparatus for an elevator system.

As shown therein, the conventional elevator system includes a converter 1 for converting a three-phase alternating current voltage AC into a direct current voltage by rectifying the same, an inverter 2 for converting the thusly converted direct current voltage into an alternating current voltage of a variable voltage and frequency type, an induction motor 4 for generating force for running an elevator car 8 using the thusly converted alternating current voltage, current sensors 3A through 3C for sensing three-phase current flowing in the induction motor 4, a sheave 5, rope 6 and balance weight 7 for receiving a force from the induction motor 4 and running the elevator car 8 along a running path formed through each floor, a velocity detector 9 for detecting an actual rotational frequency $\bar{\omega}_r$ of the induction motor 4, an over current detector 10 for comparing the current of each phase sensed by the current sensors 3A through 3C with a previously set limit current value and generating a driving stop signal of the inverter 2 when the current thereof exceeds the limit current value as a result of the comparison, current amplifiers 11A through 11C for amplifying the current of each phase sensed by the current sensors 3A through 3C to a predetermined level, respectively, a current transformer 12 for the three phase currents ($i_a$, $i_b$, $i_c$) from the current amplifiers 11A through 11C into a torque component (Q-axis) current ($i_q$), a magnetic component (D-axis) current ($i_d$), a velocity instruction generator 13 for generating a velocity instruction (W*) corresponding to the operational instruction (D*), a subtractor 14 for computing a difference of an actual rotational frequency ($\bar{\omega}_r$) between the velocity instruction (W*) and the induction motor 4, a velocity controller 15 for generating a torque component current instruction ($i_q$*) which is proportional to the above difference, a magnetic component current instruction generator 16 for generating a magnetic component current instruction ($i_d$*) corresponding to the operational instruction (D*), a subtractor 17 for computing a difference with respect to the torque component current ($i_q$) from the current transformer 12, a subtractor 18 for computing a difference between the magnetic flux component current instruction ($i_d$*) outputted from the magnetic flux component current instruction generator 16 and the magnetic flux component current ($i_d$) outputted from the current transformer 12, Q-axis and D-axis current controllers 19A and 19B for generating Q-axis and D-axis voltage instructions ($V_q$, $V_d$) for controlling the Q-axis current and d-axis current from the induction motor 4 based on the output currents from the subtractors 17 and 18, a slip computation unit 20 for computing a slip frequency $\bar{\omega}_s$ of the induction motor 4 based on the torque component current instruction ($i_q$*), an adder 21 for adding the rotational frequency $\bar{\omega}_r$ detected by the velocity detector 9 and the slip frequency $\bar{\omega}_s$ computed by the slip computation unit 20 and outputting an operational frequency $\bar{\omega}_e$ of the induction motor 4, a voltage transformer 22 for converting the operational frequency $\bar{\omega}_e$ and the Q-axis and D-axis voltage instructions $V_q$, $V_d$ into three phase voltage instructions $V_a$, $V_b$, $V_c$, a voltage limiter 23 for limiting the output ranges of the three phase voltage instructions $V_a$, $V_b$, $V_c$, and an inverter driving unit 24 for generating a pulse modulation signal corresponding to the inverter driving control signal from the voltage limiter 23 or the over current detector 10 and driving the inverter 2.

The operation of the conventional elevator system will now be explained with reference to FIGS. 1 through 4.

First, when a three phase alternating current (AC) voltage is inputted, the three phase alternating current voltage is converted into a direct current voltage by the converter 1 and is smoothed by a condenser C and is supplied to the inverter 2. The inverter 2 converts the thusly inputted direct current voltage into an alternating current voltage of a variable voltage type and variable frequency type and then is supplied to the induction motor 4.

In addition, when the velocity detector 9 detects an actual rotational frequency $\bar{\omega}_r$ of the induction motor 4, and the velocity instruction generator 12 generates a velocity instruction W* corresponding to the operational instruction D*, the subtractor 14 computes a difference between the velocity instruction W* and the rotational frequency $\bar{\omega}_r$. The velocity controller generates a torque component current instruction ($i_q$*) which is proportional to the difference, and the magnetic flux component current instruction generator 16 generates a magnetic flux component current instruction ($i_d$*) in accordance with the operational instruction D*.

FIGS. 2A through 2C are wave form diagrams of the velocity instruction W*, the torque component current instruction ($i_q$*) and the magnetic flux component current instruction ($i_d$*).

When the velocity instruction W*, as shown in FIG. 2A, is generated by the velocity instruction generator 13, the velocity controller 15 generates the torque component current instruction ($i_q$*), as shown in FIG. 2B, which is proportional to the difference between the velocity instruction W* and the rotational frequency $\bar{\omega}_r$. The magnetic flux component current instruction generator 16 generates the current instruction ($i_d$*) having a predetermined size, as shown in FIG. 2C, while the operational instruction D* is in the RUN state.

In addition, the three phase current flowing in the induction motor 4 is detected by the current sensors 3A through 3C, and the thusly detected three phase current is amplified to a predetermined level by the current amplifiers 11A through 11C.

At this time, the over current detector 10 compares the current value detected by the current sensors 3A through 3C with the set limit current value I_limit. As a result of the comparison, if the three phase current value exceeds the same, the inverter driving stop signal is generated.

FIGS. 3A and 3B illustrate wave form diagrams for explaining an operational timing of the over current detector 10.

At the point P where the current value detected by the current sensors 3A through 3C exceeds a limit current value I_limit as shown in FIG. 3A, the over current detector 10 generates an inverter driving stop signal as shown in FIG. 3B.

In addition, the three phase currents $i_a$, $i_b$, and $i_c$, amplified by the current amplifiers 11A through 11C are converted into the Q-axis and D-axis currents $i_q$, $i_d$ by the current transformer 12 based on the Equations 1 through 3.

$$i_a = I\cos(\bar{\omega}_e - \theta)$$

$$i_b = I\cos(\bar{\omega}_e - 2\pi/3 - \theta)$$

$$i_c = I\cos(\bar{\omega}_e - 2\pi/3 + \theta) \ldots \quad \text{Equation 1}$$

$$i_\alpha = (i_c - i_b)/\sqrt{3} = -I\sin(\bar{\omega}_e - \theta)$$

$$i_\beta = i_a = I\cos(\bar{\omega}_e - \theta) \ldots \quad \text{Equation 2}$$

$$i_d = \cos(\bar{\omega}_e t) \times i_\alpha + \sin(\bar{\omega}_e t) \times i_\beta = I\sin(\theta)$$

$$i_q = -\sin(\bar{\omega}_e t) \times i_\alpha + \cos(\bar{\omega}_e t) \times i_\beta = I\cos(\theta) \ldots \quad \text{Equation 3}$$

where $\bar{\omega}_e$ denotes the operational frequency, and $\theta$ denotes the phase angle.

As seen in Equation 3, the Q-axis and D-axis currents $i_q$ and $i_d$ are inputted into the subtractors 17 and 18, respectively, and are compared with the torque component current instruction ($i_q^*$) and the magnetic flux component current instruction ($i_d^*$) outputted from the velocity controller 15 and the magnetic flux component current instruction generator 16. When a difference value corresponding to the comparison is outputted, the Q-axis current controller 19A and D-axis current controller 19B generate the Q-axis and D-axis voltage instructions $V_q$ and $V_d$.

In addition, when the slip computation unit 20 outputs a slip frequency $\bar{\omega}_s$ which is proportional to the torque component current instruction ($i_q^*$) outputted from the velocity controller 15, the adder 21 adds the slip frequency $\bar{\omega}_s$ and the rotational frequency $\bar{\omega}_r$ of the induction motor 4, thus outputting an operational frequency $\bar{\omega}_e$.

In addition, the voltage transformer 22 outputs the three phase voltage instructions $V_a$, $V_b$, and $V_c$ based on the following Equations 4 and 5 using the operational frequency $\bar{\omega}_e$ outputted from the adder 21 and the Q-axis and d-axis voltage instructions $V_q$ and $V_d$ generated by the Q-axis and D-axis current controllers 19A and 19B.

$$V_\alpha = -V_q \times \sin(\bar{\omega}_e t) + V_d \times \cos(\bar{\omega}_e t)$$

$$V_\beta = +V_q \times \cos(\bar{\omega}_e t) + V_d \times \sin(\bar{\omega}_e t) \ldots \quad \text{Equation 4}$$

$$V_a = V_\beta$$

$$V_b = -\frac{1}{2}V_\beta - \frac{\sqrt{3}}{2}V_\alpha$$

$$V_c = -\frac{1}{2}V_\beta + \frac{\sqrt{3}}{2}V_\alpha \quad \text{Equation 5}$$

The thusly computed three phase voltage instructions $V_a$, $V_b$ and $V_c$ are inputted into the voltage limiter 23 and compared with the limit voltage value V_limit. Only the voltage is below the limit voltage value V-limit is applied to the inverter driving unit 24, so that the over voltage is not applied to the inverter 2 and the induction motor 4.

FIGS. 4A and 4B illustrate the wave form diagrams of voltage signals applied to the induction motor 4.

When the velocity instruction W*, as shown in FIG. 4A, occurs, the applying voltage of the induction motor 4 which is proportional to the thusly occurring velocity instruction W* is outputted as shown in FIG. 4B. Here, V-rate denotes a rated voltage, and V-limit denotes a limit voltage value.

As shown in FIG. 4B, the applying voltage which is limited below the limit voltage value V_limit is inputted into the inverter driving unit 24, and the inverter driving unit 24 outputs a pulse-modulated signal to the inverter 2 when the operational instruction D* is in a RUN state, namely, it is activated, thus switching and internal power transistor, so that it is possible to control the velocity and current of the induction motor.

In addition, the rotational force of the induction motor 4 is transferred to the car 8 through the sheave 5 and rope 6, so that the car 8 is moved to a destination floor along the running path.

In the conventional current/voltage control apparatus for an elevator system, the over current detector 12 and the voltage limiter 23 are provided for preventing an over current and voltage from being transferred to the inverter 2.

As shown in FIG. 4, the limit voltage value V_limit of the voltage limiter 23 always maintains a constant value. However, the applying voltage applied to the induction motor 4 is always proportional to the velocity of the induction motor 4.

Therefore, when the induction motor 4 operates at a low velocity, the Q-axis and D-axis currents are controlled by a voltage which is lower than the rated voltage V_rate, so that it is impossible to obtain a desired prevention operation with respect to the system.

In addition, if the three phase parameters of the induction motor 4 are parallel, the three phase currents flowing in the induction motor 4 become parallel based on Equation 1, so that the sum of the three phase currents, namely, the zero phase component current becomes 0. If the three phase parameters are not parallel due to a predetermined factor, since the three phase currents flowing in the induction motor 4 are not parallel, the sum of the three currents does not become zero.

In this case, the current flowing in the induction motor 4 may become smaller than the limit current value I_limit of the over current detector 10, or may become larger than the rated current of the induction motor 4. since the conventional over current detector 10 is not capable of detecting the above-described problem, the elevator system is continuously operated irrespective of the above-described problems, so that more serious problem may occur.

In addition, in the current control circuit if the current value is not detected due to a failure of the current sensors 3A through 3C, or the short circuit of the sensor output cable, a large voltage instruction occurs in the Q-axis and D-axis current controllers 19A and 19B during a low velocity operation. Therefore, an over current flows in the inverter and induction motor. When this over current is not detected, the inverter and motor may be damaged.

SUMMARY OF THE INVENTION

Accordingly, it is an object of the present invention to provide a current/voltage control apparatus for an elevator system which overcomes the aforementioned problems encountered in the background art.

It is another object of the present invention to provide a current/voltage control apparatus for an elevator system which is capable of limiting an applying voltage of an induction motor by setting a limit voltage to be varied based on a velocity of the induction motor in order to effectively prevent an over voltage from being applied to an inverter.

It is still another object of the present invention to provide a current/voltage control apparatus for an elevator system which is capable of preventing an over current from being applied to an inverter when three phase parameters of the induction motor are not parallel.

It is still another object of the present invention to provide a current/voltage control apparatus for an elevator system which is capable of preventing an over current from being applied to an inverter by stopping a driving operation of the inverter when a difference (hereinafter called "current deviation") between a current instruction and actual current value exceed a predetermined value during a predetermined time.

To achieve the above objects, there is provided a current/voltage control apparatus for an elevator system which includes a voltage limiter for setting a limit voltage value which is proportional to an operational frequency of the induction motor and applying the voltage below the limit voltage value to the inverter driving unit, a zero phase component current detector for detecting a zero phase component current and outputting an inverter driving stop signal to the inverter driving unit when the thusly detected current exceeds a predetermined reference value, and a current deviation detector for detecting a current deviation value and outputting an inverter driving stop signal to the inverter driving unit when the current deviation value, which exceeds a predetermined reference value, is continuously maintained for a predetermined time.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A through 2C are wave form diagrams illustrating a velocity component, torque component current instruction and magnetic component current instruction in the apparatus of FIG. 1;

FIGS. 3A and 3B are operational timing wave form diagrams of signals from an over current detector in the apparatus of FIG. 1;

FIGS. 4A through 4C are wave form diagrams illustrating a voltage applied to an induction motor in the apparatus of FIG. 1;

FIG. 6 is a detailed circuit diagram illustrating a zero phase component current detector of FIG. 5;

FIGS. 7A through 7C are operational timing wave form diagrams of signals from a zero phase component current detector;

FIGS. 8A through 8C are operational timing wave form diagrams of signals from a current deviation detection of FIG. 5; and FIGS. 9A through 9C are operational timing wave form diagrams of signals from a voltage limiter of FIG. 5.

DETAILED DESCRIPTION OF THE PREFERRED EMBODIMENTS

Figure 1:
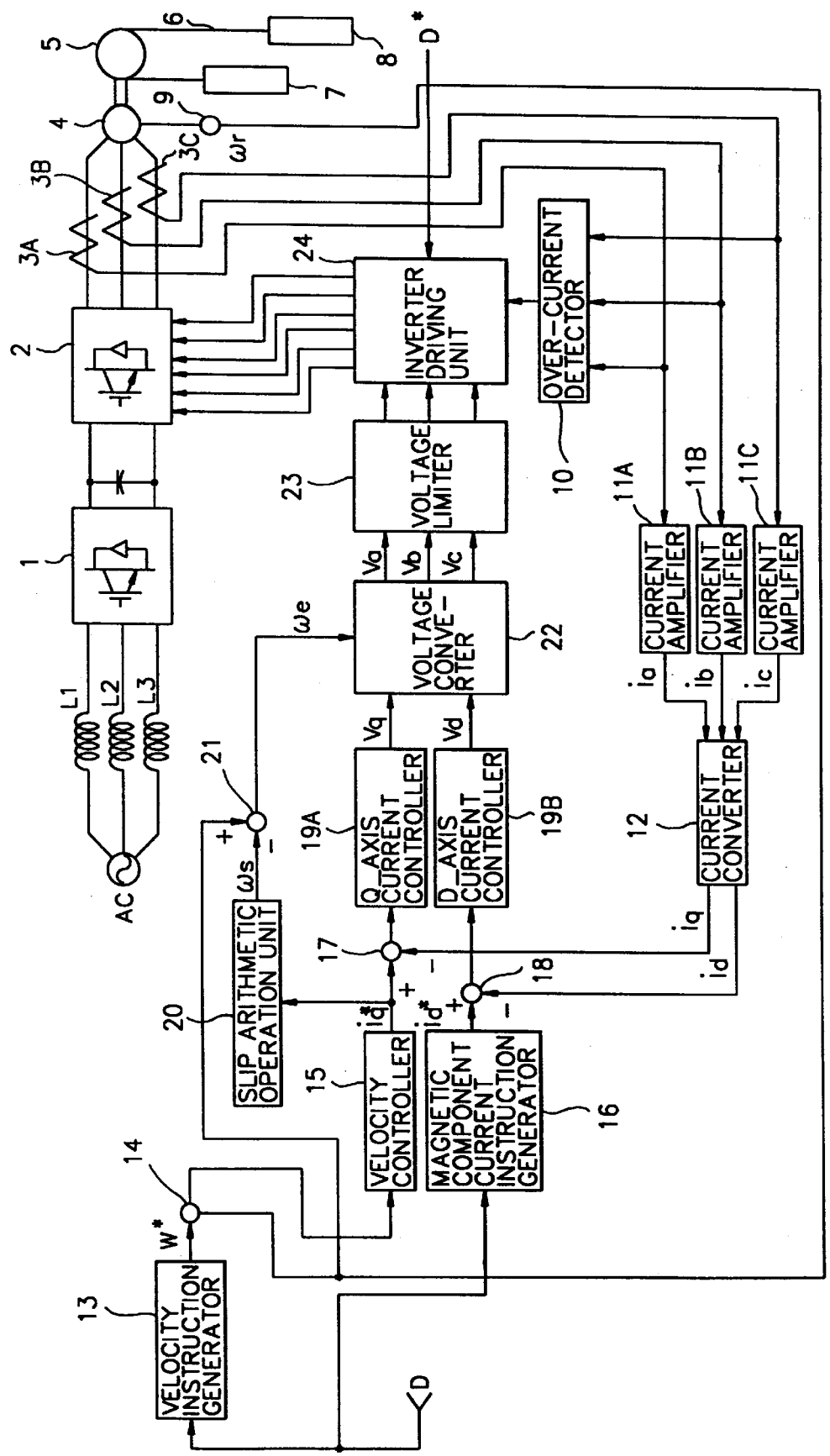
FIG. 1 is a block diagram illustrating a conventional current/voltage control apparatus for an elevator system.
Figure 5:
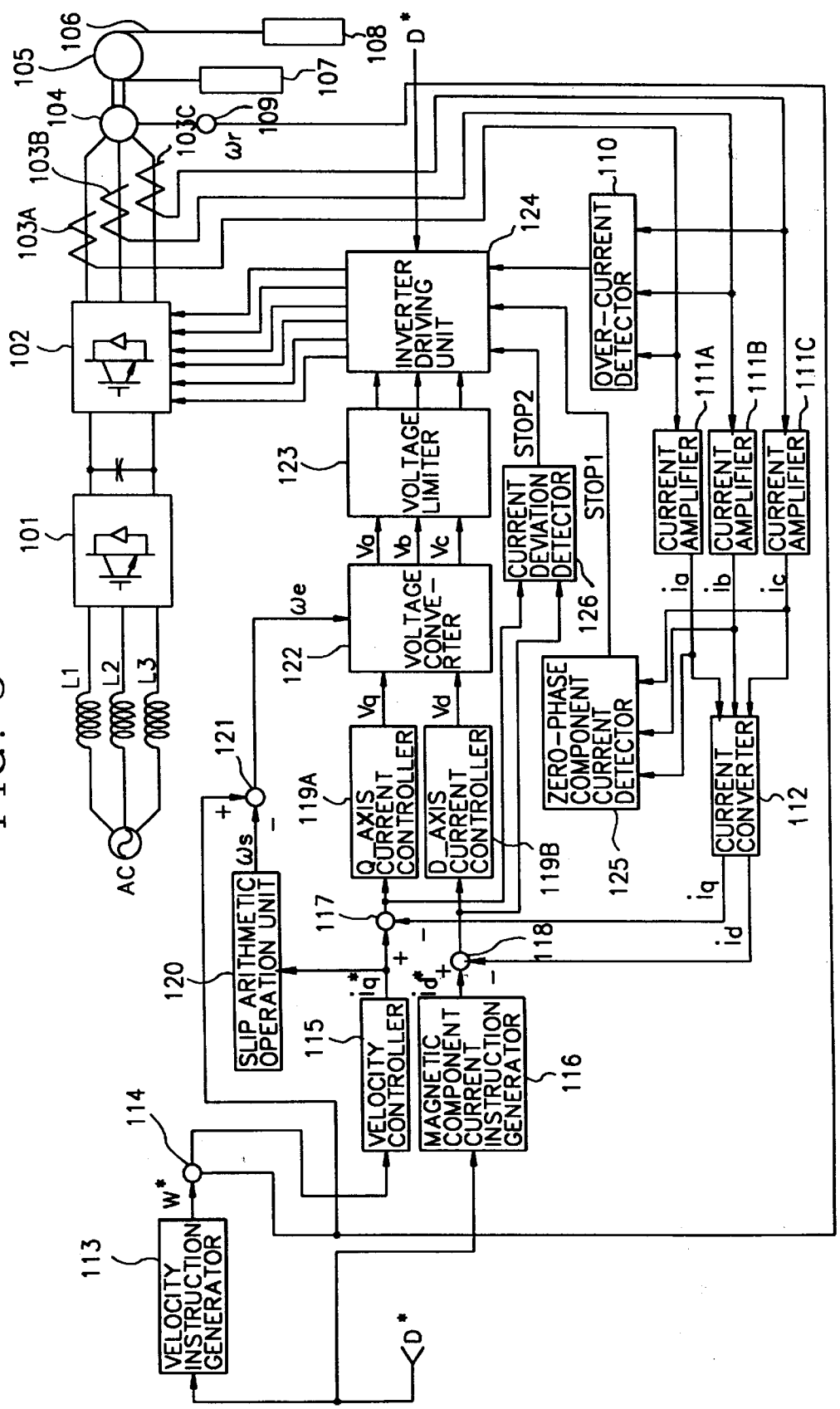
FIG. 5 is a block diagram illustrating a current/voltage control apparatus for an elevator system according to the present invention.

FIG. 5 illustrates a current/voltage control apparatus for an elevator system according to the present invention.

As shown therein, the current/voltage control apparatus for an elevator system according to the present invention includes a converter 101 for rectifying a three-phase alternating current (AC) voltage and converting the same into a direct current voltage, an inverter 102 for inverting the thusly converted direct current voltage into an alternating current voltage of a variable voltage and variable frequency type, an induction motor 104 for generating an operational force for running the elevator car 108 using the converted alternating current voltage, current sensors 103A through 103C for detecting a three phase current flowing in the induction motor 104, a sheave 105, rope 106 and balance weight 107 for receiving the driving force from the induction motor 104 for running the elevator car 108 along a running path, a velocity detector 109 for detecting an actual rotation frequency $\overline{\omega}_r$, of the induction motor 104, an over current detector 110 for comparing the current of each phase detected by the current sensors 103A through 103C with the previously set limit current value I-limit and generating a driving stop signal of the inverter 102 when the current of each phase exceeds the limit current value I__limit, current amplifiers 111A through 111C for amplifying the currents of each phase detected by the current sensors 103A through 103C into a predetermined level, respectively, a current transformer 112 for converting the three phase currents ($i_a$, $i_b$, $i_c$) into the torque component (Q-axis) current ($i_q$) and the magnetic flux component (D-axis) current ($i_d$), a velocity instruction generator 113 for generating a velocity instruction W* corresponding to the operational instruction D*, a subtractor 114 for computing a difference between the velocity instruction W* and the actual rotational frequency $\overline{\omega}_r$ of the induction motor 4, a velocity controller 115 for generating a torque component current instruction ($i_q$*) which is proportional to the above-described difference, a magnetic flux component current instruction generator 116 for generating a magnetic flux component current instruction ($i_d$*) corresponding to the operational instruction D*, a subtractor 117 for computing a difference between the torque component current instruction ($i_q$*) outputted from the velocity controller 115 and a torque component current ($i_q$) outputted from the current transformer 112, a subtractor 118 for computing a difference between the magnetic flux component current instruction ($i_d$*) outputted from the magnetic flux component current instruction generator 116 and the magnetic flux component current ($i_d$) outputted from the current transformer 112, Q-axis and D-axis current controllers 119A and 119B for generating Q-axis and D-axis voltage instructions $V_q$ and $V_d$ for controlling the Q-axis current and D-axis current of the induction motor 104 based on the output currents of the subtractors 117 and 118, a slip computation unit 120 for computing the slip frequency $\overline{\omega}_s$ of the induction motor 4 based on the torque component current instruction ($i_q^*$) an adder 121 for adding the rotational frequency $\overline{\omega}_r$ detected by the velocity detector 109 and the slip frequency $\overline{\omega}_s$ computed by the slip computation unit 120 and outputting an operational frequency $\overline{\omega}_e$ of the induction motor 104, a voltage transformer 122 for transforming the operational frequency $\overline{\omega}_e$ and the Q-axis and D-axis voltage instructions $V_q$ and $V_d$ into the three phase voltage instructions $V_a$, $V_b$, $V_c$ to be applied to the induction motor 104, and an inverter driving unit 124 for receiving an inverter driving control signal, generating a pulse width modulation signal corresponding thereto, and driving the inverter 102. There are further provided a voltage limiter 123 for setting a limit voltage value which is proportional to the operational frequency $\overline{\omega}_e$ and applying the voltage which is below the limit voltage value to the inverter driving unit 124, a zero phase component current detector 125 for detecting the zero phase component current and outputting an inverter driving stop signal STOP1 to the inverter driving unit 124 when the thusly detected value exceeds a predetermined reference value, and a current deviation detector 126 for detecting the current deviation between the Q-axis and D-axis current instructions ($i_q^*$, $i_d^*$) and the actual current ($i_q$, $i_d$) and outputting an inverter driving stop signal STOP2 to the inverter driving unit 124 when the current deviation which exceeds a predetermined reference value which is continuous for a predetermined time.

In addition, FIG. 6 is a detailed block diagram illustrating the zero phase component current detector 125 shown in FIG. 5.

As shown therein, the zero phase component current detector 125 includes a summing unit 201 for computing a zero phase component current by adding the three phase currents ($i_a$, $i_b$, $i_c$), a comparator 202 for comparing the zero phase component current value with a reference value Ref1 and a latch unit 203 for outputting an inverter driving stop signal to the inverter driving unit 124 when the zero phase component current value exceeds the reference value Ref1 as a result of the comparison.

The operation of the current/voltage control apparatus for an elevator system according to the present invention will now be explained with reference to the accompanying drawings.

The description concerning the construction that is same as the conventional art will be omitted.

As shown in FIGS. 5 through 9, when the three phase currents ($i_a$, $i_b$, $i_c$) which are amplified to a predetermined level by the current amplifiers 111A through 111B are inputted into the zero phase component current detector 125, the summing unit 201 of the zero component current detector 125 sums the three phase currents, namely, the zero phase component current.

In addition, the zero phase component current is inputted into the comparator 202 and is compared with the previously set reference value Ref1. As a result of the comparison, if the zero phase component current value is larger than the reference value Ref1, the inverter driving stop signal STOP1 is outputted through the latch unit 203.

FIGS. 7A through 7C are wave form diagrams for explaining the operational timing of the zero phase component current detector 125 when an unbalance of the current occurs.

When the three phase currents ($i_a$, $i_b$, $i_c$) shown in FIG. 7A are inputted, the zero phase component current which is a result of the summing operation is shown in FIG. 7B.

The thusly obtained zero phase component current is compared with the 10 previously set reference value Ref1 by the comparator 202. As a result of the comparison, at the point P1 where the zero phase component current value exceeds a reference value Ref1, a predetermined level high electric potential is outputted from the comparator 202, and the thusly outputted electric potential is applied to the latch unit 203, so that the inverter driving stop signal STOP1 shown in FIG. 7C is applied to the inverter driving unit 124.

In addition, the current deviation detector 126 detects a difference value between the Q-axis and D-axis current instructions ($i_q^*$, $i_d^*$) outputted from the subtractors 117 and 118 and the Q-axis and D-axis currents ($i_q$, $i_d$), namely the current deviation. If the current deviation which exceeds a predetermined reference value Ref2 is continued for a predetermined time dt2, the inverter driving stop signal STOP is outputted from the inverter driving unit 124.

FIGS. 8A through 8C are operational timing diagrams of signals from the current deviation detector 126.

FIG. 8A illustrates a wave form diagram of a current deviation value which is a difference value between the Q-axis and d-axis current instructions ($i_q^*$, $i_d^*$) and the Q-axis and D-axis currents ($i_q$, $i_d$).

If the current deviation exceeds a predetermined reference value Ref2 for a predetermined time dt2, the inverter driving stop signal STOP2 shown in FIG. 8C is outputted to the inverter driving unit 124 at the point P2, so that the inverter 102 is stopped thereby.

Generally, in the normal control state, since the number of step responses of the current controllers 119A and 119B is a few msec (dt1), the predetermined time dt2 which becomes a reference becomes 2~3 times.

Even when the malfunctions occur in the current sensors 103A through 103C and the over current detector 110, it is possible to prevent the over current from being applied to the inverter 102 using the current deviation detector 126.

The voltage limiter 123 limits the three phase applying voltage, which is transformed by the voltage transformer 122 and is supplied to the induction motor 104, to be below the limit voltage value. At this time, the limit voltage value maintains a maximum voltage for a predetermined time at the initial stage. After a predetermined time is elapsed, the limit voltage value is set proportionally to the operation frequency ($\overline{\omega}_e$) outputted from the adder 121 based on Equation 6.

$$V\text{\_limit} = V\text{\_offset} + \overline{\omega}_e^* K \ldots \qquad \text{Equation 6}$$

FIGS. 9A through 9C are wave form diagrams illustrating an operational timing of the voltage limiter 123.

As shown therein, the voltage limiter 123 maintains the limit voltage V_limit as the maximum voltage V_max for a predetermined time when the operational instruction D* is activated. After a predetermined time is elapsed, the limit voltage value V_limit is set in accordance with Equation 6 proportionally to the operation frequency $\overline{\omega}_e$ outputted from the adder 121, so that the applying voltage is limited.

The maximum voltage is maintained for a predetermined time for the reason that the rated voltage may be applied until the magnetic fluxes are obtained due to the over state of the induction motor 104.

The maximum voltage value V_max is set to be between the maximum voltage that the inverter 102 can output and the rated voltage V_rate of the induction motor 104.

In addition, in Equation 6, the proportional constant K is set so that the operational frequency becomes the maximum voltage V_max at about 90% of the rated frequency because the maximum voltage is applied to the induction motor 104 at the time when the acceleration completion is finished based on the operational characteristic of the elevator system. The acceleration is finished when it becomes 90% of the rated frequency.

In addition, the offset value V_offset is set to be above the voltage by which the induction motor 104 generates the rated torque around zero velocity. As the operational frequency is increased, the voltage limit value V_limit is proportionally increased based on Equation 6. The result of the computation is controlled to be below the maximum voltage V_max.

As described above, in the present invention, the limit voltage value of the voltage limiter is not fixed to a predetermined value. Namely, it is variably set in accordance with the operational frequency of the induction motor, so that it is possible to prevent a predetermined amount of driving voltages from being supplied when the induction motor is operated at a low velocity, whereby an over current is prevented when a predetermined failure or short circuit occurs in the current sensor.

If a predetermined amount of reference values is detected in the zero phase component current due to the unbalance of the three phase parameter by additionally providing the zero phase component current detector, the inverter driving stop signal is outputted to the inverter driving unit, so that it is possible to prevent the over current from being supplied to the inverter.

In addition, when the current deviation inputted into the current controller is inputted by more than a predetermined reference value for a predetermined time, the inverter driving stop signal is outputted to the inverter driving unit, so that it is possible to prevent the over current from being transferred to the inverter, thus preventing the inverter and motor from being damaged.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A current/voltage control apparatus for an elevator system including an inverter for inverting a direct-current voltage into an alternating-current voltage of a variable voltage-and-frequency-type to be applied to an induction motor, an inverter controller for detecting a current phase flowing in the induction motor, generating a voltage instruction based on the detected phase and controlling the inverter, and an inverter driving unit for receiving an output signal from the inverter controller, generating a pulse width modulation signal corresponding thereto and driving the inverter, said control apparatus comprising:

a voltage limiter for setting a limit voltage value which is proportional to an operational frequency of the induction motor and applying the voltage below the limit voltage value to the inverter driving unit;

a zero phase component current detector for detecting a zero phase component current and outputting an inverter driving stop signal to the inverter driving unit when the thusly detected current exceeds a predetermined reference value; and a current deviation detector for detecting a current deviation value and outputting an inverter driving stop signal to the inverter driving unit when the current deviation value exceeds a predetermined reference value continuously for a predetermined time.

2. The apparatus of claim 1, wherein said voltage limiter outputs a limit voltage value which is proportional to the operational frequency after a predetermined voltage is maintained for a predetermined time after the operation of the same, and a predetermined time is elapsed.

3. The apparatus of claim 1, wherein said zero phase component current detector includes:

a summing unit for summing three-phase currents, thus obtaining a zero phase component current;

a comparator for comparing the zero phase component current value with a predetermined reference value; and a latch unit for outputting an inverter driving stop signal to the inverter driving unit when the zero phase component current value exceeds a predetermined value as a result of the comparison.

4. The apparatus of claim 1, wherein said current deviation value is a difference value between a current instruction with respect to a torque component and a magnetic component and an actually detected current value.

5. A current voltage control apparatus for an elevator system including an inverter for inverting a direct-current voltage into a variable voltage-and-frequency-type of alternating-current voltage to be applied to an induction motor, and an inverter controller for detecting a current phase flowing in the induction motor, for generating a voltage instruction based on the detected phase and for controlling the inverter, said control apparatus comprising:

a voltage limiter to limit maximum values of control signals from said inverter controller as a function of an operation frequency of said induction motor, said voltage limiter producing upper-bounded control signals; and an inverter driving unit for generating a pulse width modulation signal to drive said inverter based upon said upper-bounded control signals.

6. The control apparatus of claim 5, wherein, after said upper-bounded control signals reach a maximum value, respectively, said voltage limiter is operable to maintain said upper-bounded control signals at the maximum values thereof, respectively, for a predetermined time, after which said voltage limiter is operable to make said upper-bounded control signals proportional to said operation frequency of said induction motor.

7. The control apparatus of claim 5, further comprising:

a zero-phase-component current detector to detect a zero phase component current and to output an inverter driving stop signal to said inverter driving unit when said current detector determines said current exceeds a predetermined reference value.

8. The control apparatus of claim 7, wherein a plurality of motor currents are applied to drive said induction motor, and said current detector is operable to add said plurality of motor currents to produce a sum against which said predetermined reference is compared.

9. The control apparatus of claim 5, further comprising:

a current deviation detector to detect a current deviation value and to output an inverter driving stop signal to said inverter driving unit when said deviation value exceeds a reference value.

10. The control apparatus of claim 9, wherein said deviation detector is operable to output said stop signal after said deviation value has exceeded said reference value for a preset time.

11. A current voltage control apparatus for an elevator system including an inverter for inverting a direct-current voltage into a variable voltage-and-frequency-type of alternating-current voltage to be applied to an induction motor, said control apparatus comprising:

a voltage limiter to produce upper-bounded control signals;

an inverter driving unit for generating a pulse width modulation signal to drive said inverter based upon said upper-bounded control signals;

a zero-phase-component current detector to detect a zero phase component current flowing in the induction motor and to provide a first inverter driving stop signal to said inverter driving unit when said zero-phase-component current detector determines that said current exceeds a predetermined reference value; and a current deviation detector to provide a second inverter driving stop signal to said inverter driving unit based upon at least one of a Q-axis current derived from motor currents flowing in said induction motor and a D-axis current derived from said motor currents.

12. The control apparatus of claim 11, wherein a plurality of motor currents are applied to drive said induction motor, and said current detector is operable to add said plurality of motor currents to produce a sum against which said predetermined reference is compared.

13. The control apparatus of claim 11, wherein said second inverter driving stop signal is based upon at least one of a first error between a Q-axis current and a corresponding Q-axis instruction and a second error between a D-axis current and a corresponding D-axis instruction.

14. The control apparatus of claim 11, wherein said second inverter driving stop signal is based upon a difference between said first error and said second error.

15. The control apparatus of claim 14, wherein said second inverter driving stop signal is generated if said difference exceeds a reference value for a minimum duration.

* * * * *